(12) United States Patent
Wymeersch et al.

(10) Patent No.: US 9,329,257 B2
(45) Date of Patent: May 3, 2016

(54) COOPERATIVE LOCALIZATION FOR WIRELESS NETWORKS

(75) Inventors: Henk Wymeersch, Boston, MA (US);
Moe Z. Win, Framingham, MA (US);
Jaime Lien, Pasadena, CA (US)

(73) Assignee: Massachusetts Institute of Technology, Cambridge, MA (US)

( * ) Notice: Subject to any disclaimer, the term of this patent is extended or adjusted under 35 U.S.C. 154(b) by 1552 days.

(21) Appl. No.: 11/977,754

(22) Filed: Oct. 25, 2007

(65) Prior Publication Data

US 2008/0268873 A1   Oct. 30, 2008

Related U.S. Application Data

(60) Provisional application No. 60/854,393, filed on Oct. 25, 2006.

(51) Int. Cl.
*G01S 5/02* (2010.01)
*H04W 4/02* (2009.01)

(52) U.S. Cl.
CPC ............. *G01S 5/0289* (2013.01); *H04W 4/025* (2013.01); *G01S 5/0284* (2013.01)

(58) Field of Classification Search
CPC ........ G01S 5/02; G01S 5/0278; G01S 5/0284; H04W 64/006; H04W 64/00; H04W 4/02; H04W 4/023; H04W 4/025; H04W 2242/30
USPC ........... 455/456.1–456.6, 41.2; 370/331, 332, 370/338
See application file for complete search history.

(56) References Cited

U.S. PATENT DOCUMENTS

| | | | | |
|---|---|---|---|---|
| 5,293,642 | A  * | 3/1994 | Lo ............................... | 455/456.2 |
| 7,689,240 | B2 * | 3/2010 | Anderson ..................... | 455/522 |
| 7,751,827 | B2 * | 7/2010 | Poykko et al. ............. | 455/456.1 |
| 2002/0055362 | A1 * | 5/2002 | Aoyama ...................... | 455/456 |
| 2004/0180671 | A1 * | 9/2004 | Spain, Jr. ................... | 455/456.1 |
| 2004/0266457 | A1 * | 12/2004 | Dupray ...................... | 455/456.5 |
| 2005/0197139 | A1 * | 9/2005 | Misikangas et al. ....... | 455/456.1 |
| 2005/0258957 | A1 * | 11/2005 | Krumm et al. ........... | 340/539.13 |
| 2006/0009194 | A1 * | 1/2006 | Ross ............................ | 455/406 |

(Continued)

FOREIGN PATENT DOCUMENTS

JP       2002-152798       5/2002

OTHER PUBLICATIONS

Jung-Chieh Chen, Mobile Position Location Using factor graphs, IEEE Communications Letters, Sep. 2003.*

(Continued)

*Primary Examiner* — Charles Appiah
*Assistant Examiner* — Edward Zhang
(74) *Attorney, Agent, or Firm* — Hamilton, Brook, Smith & Reynolds, P.C.

(57) ABSTRACT

A system and corresponding method using a cooperative localization technique for self identifying a location of a wireless device in a wireless network is presented. The system may estimate an arbitrary signal metric as a function of a signal received by the wireless device from the at least one other wireless device in the wireless network. The system may also convert at least one belief representing a distribution of at least one possible location of the at least one other wireless device to generate at least one converted belief. The system may further determine a self-belief as a function of the at least one converted belief and identify a self location, as a function of the self-belief, within the wireless network.

24 Claims, 6 Drawing Sheets

(56) References Cited

U.S. PATENT DOCUMENTS

| | | | | |
|---|---|---|---|---|
| 2006/0217127 | A1* | 9/2006 | Drane et al. | 455/456.1 |
| 2006/0281470 | A1* | 12/2006 | Shi | G01S 5/0289 455/456.2 |
| 2007/0001867 | A1* | 1/2007 | Rowe et al. | 340/825.49 |
| 2007/0054617 | A1* | 3/2007 | Nikolajevic et al. | 455/41.2 |

OTHER PUBLICATIONS

Ihler, A.T., et al., "Nonparametric Belief Propagation for Self-Localization of Sensor Networks," *IEEE J.*, 23(4): 809-819 (2005).

Fox, D., et al., "A Probabilistic Approach to Collaborative Multi-Robot Localization," *Autonomous Robots*, 8(3): 325-344 (2000).

Denis, B., et al., "Joint distributed synchronization and positioning in UWB ad hoc networks using TOA," *IEEE Trans.*, 54(4): 896-1911 (2006).

Fox, D., et al. "A Monte Carlo algorithm for multi-robot localization," Computer Science Department, Carnegie Mellon University, Pittsburgh, PA, Tech. Rep. CMU-CS-99-120, (1999).

Patwari, N., et al., "Locating the Nodes: Cooperative Localization in Wireless Sensor Networks," IEEE Signal Processing Magazine, 22(4): 54-69 (2005).

Peng, R. and Sichitiu, M.L., "Probabilistic localization for outdoor wireless sensor networks" SIGMOBILE Mob. Comput. Commun., 11(1): 53-64 (2007).

Ihler, A.T., et al., "Nonparametric Belief Propagation for Self-Calibration in Sensor Networks" Int. Symp. Info. Proc. Sensor Networks, 1, 2, 5-7 (2004).

Marinakis, D. and Dudek, G., "Probabilistic Self-Localization for Sensor Networks," Proceedings of the $21^{st}$ AAAI Conference on Artificial Intelligence (2006).

International Search Report from PCT/US2007/022572 mailed on Nov. 4, 2008.

Notification Concerning Transmittal of International Preliminary Report on Patentability (Chapter I of the Patent Cooperation Treaty) and Written Opinion of the International Searching Authority for International application No. PCT/US2007/022572, mailed May 7, 2009.

\* cited by examiner

ARBITRARY SIGNAL METRICS EXAMPLES

DISTANCE BASED
(symmetrical)

FIG. 3B

- Possible location of agent MS1 may be comprised anywhere along the two lines

ANGLE BASED
(non-symmetrical)

FIG. 3C

CONNECTIVITY BASED
(non-symmetrical)

COOPERATIVE LOCALIZATION FOR WIRELESS NETWORKS

RELATED APPLICATIONS

This application claims the benefit of U.S. Provisional Application No. 60/854,393, filed on Oct. 25, 2006, entitled "COOPERATIVE LOCALIZATION FOR UWB NETWORKS." The entire teachings of the above application are incorporated herein by reference.

GOVERNMENT SUPPORT

The invention was supported, in whole or in part, by the National Science Foundation under Grant Nos. ECCS-0636519 and ANI-0336518, and the Office of Naval Research under Grant No. N00014-03-1-0489. The Government has certain rights in the invention.

BACKGROUND OF THE INVENTION

Location-aware technologies have the potential to revolutionize computing, cellular services, sensor networks, and many other commercial, military, and social applications. Localization may be used to find the location of wireless devices in a network. The network may include any number of wireless devices, known as agents, as well as a number of anchors. Anchors (e.g., cellular base stations) may typically One known technique for determining the location of agents in a network is centralized localization. In centralized localization, each node (e.g., anchors and agents) in the network routes its collection of relative positioning measurements to a central processing unit. The central processing unit may determine the locations of all the nodes in the network using a set of measurements obtained from each node, for example, by employing an optimization function over the set of measurements.

The majority of current localization methods utilize another known localization technique referred to as non-cooperative localization. In a non-cooperative localization approach, there is no communication between agents; there only exists communication between agents and anchors. During the localization process, an agent may need to be in communication range with as many as three anchors in order to determine its location. Thus, in order for an agent to locate itself, a number of anchors may need to be employed in order to ensure each agent has access to enough data to determine its location. Thus, to locate all agents non-cooperative localization may require either a high density of anchors or long-range high-power anchor transmissions.

A third known technique of localization is cooperative localization. In cooperative localization, inter-agent communication is allowed, removing the need for all agents to be within communication range of multiple anchors. Therefore, agents may act as virtual anchors for other agents. Since every agent has more information available, cooperative localization may offer more accuracy and coverage.

SUMMARY OF THE INVENTION

Although prior art methods of cooperative localization offer improvements over current centralized and non-cooperative localization methods, these prior art cooperative localization methods still include a number of drawbacks. Prior art cooperative localization methods typically allow only the exchange of a single position estimate from node to node. The use of single estimates may introduce inaccuracies in localization computation. Furthermore, prior art methods of cooperative localization only make use of symmetrical data sets, such as node-to-node distance estimations. Prior art methods of cooperative localization also require that all the nodes in the network be homogenous, where processed signal metrics, such as received signal strength, may be obtained by nodes in communication with each other that are of an equal type. Also, in prior art methods of cooperative localization, it is typically necessary that each node use the same process, or algorithm, of estimating the signal metrics, thereby making it necessary that each node include identical hardware and software capabilities.

In an example embodiment of the present invention, a cooperative localization technique is utilized to obtain distributions of possible locations for the agents in the network system by allowing agents and anchors to transmit probabilities of their possible locations. In an embodiment of the present invention, heterogeneous nodes and heterogeneous processing methods may be employed to process symmetrical and non-symmetrical data sets, which may greatly improve localization capabilities. In another embodiment of the present invention, factor graph theory may be used to develop a fully cooperative localization method to determine an estimated position of all the nodes in the network.

In an embodiment of the present invention, a system and corresponding method for self identifying a location of a wireless device in a wireless network are described. The system may comprise a calculating unit configured to calculate at least one converted belief representing a distribution of at least one possible location of the wireless device within the wireless network. The at least one converted belief may be a function of an arbitrary signal metric associated with a wireless signal received by the wireless device from at least one other wireless device. The distribution may be a probability density or a mass function. The system may further include a belief determining unit configured to determine a self-belief as a function of the at least one converted belief, and an identifying unit configured to identify a self location, as a function of the self-belief, within the wireless network.

The wireless network may be time varying. Specifically, at least a subset of multiple other wireless devices may be mobile relative to at least one other subset of multiple other wireless devices, and respective estimating, converting, belief determining, and identifying units may be further configured to account for mobility.

The respective estimating units of at least a subset of multiple other wireless devices may be configured to estimate the arbitrary signal metric of a first type, and respective estimating units of at least one other subset of the multiple other wireless devices may be configured to estimate the arbitrary signal metric of a second type. The arbitrary signal metric may be a characteristic of the wireless device with respect to the at least one other wireless device, and the characteristic may be selected from a group consisting of: angle, distance, connectivity, position, pose, velocity, and angular velocity information. The characteristic corresponding to an arbitrary signal metric of the first type may be non-symmetrical with respect to the characteristic corresponding to an arbitrary signal metric of the second type.

The converting unit may be further configured to convert the at least one belief, and the determining unit may be configured to determine the self-belief, based on factor graph principles. The converting unit may also be further configured to self account for a capability related to estimating the arbitrary signal metric.

The determining unit may be further configured to update a previously determined self-belief or determine a new self-belief. The identifying unit may be further configured to identify a location of at least one other wireless device in the wireless network.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1:
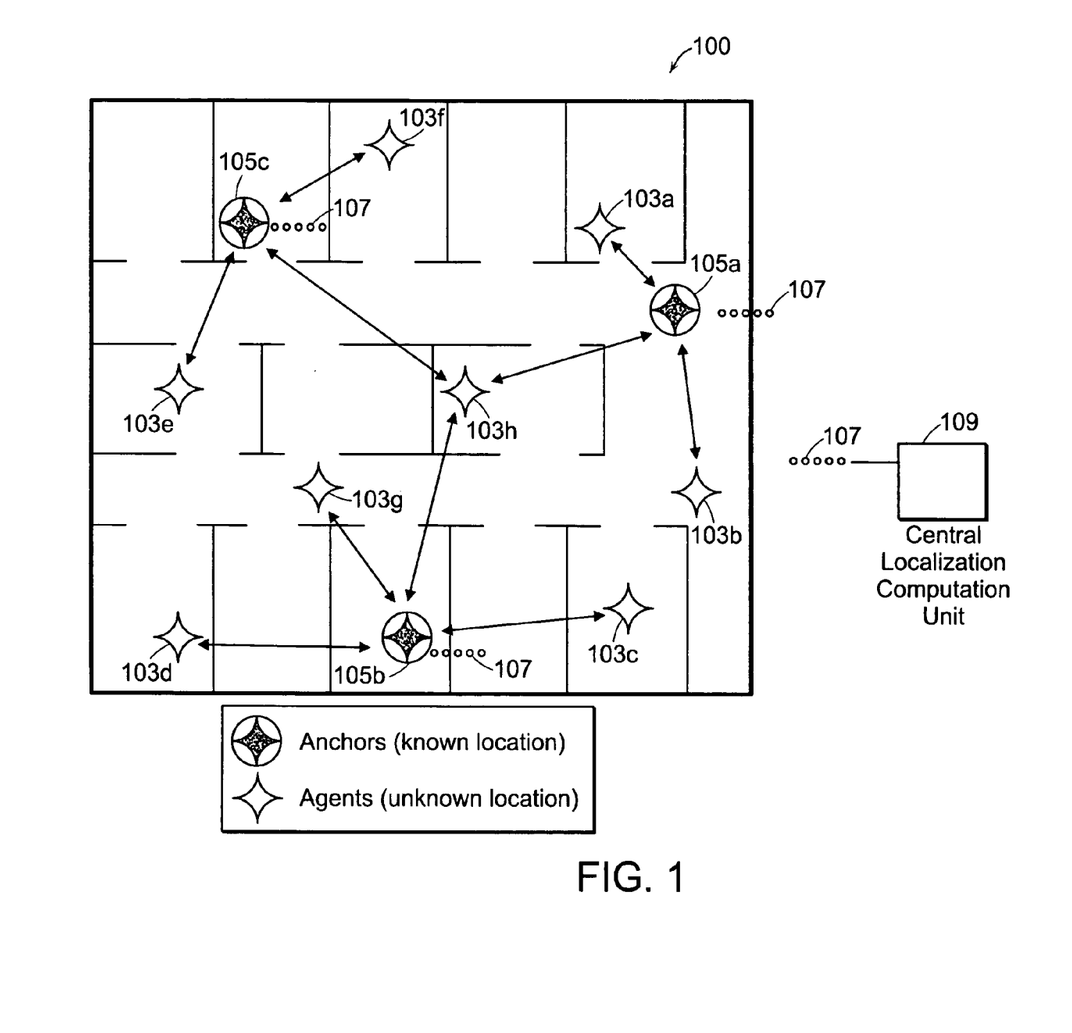
FIGS. 1 and 2 are overhead diagrams of environments in which example localization methods and corresponding apparatus according to the present invention may be employed.

FIG. 1 provides an example of a floor plan of an indoor environment 100 featuring various mobile devices, or agents 103a-103h, employing a centralized location method. The agents may be, for example, wireless devices associated with individual firemen during a search and rescue mission. The wireless devices may be mobile and therefore have an unknown location at times. The wireless devices may solely rely on "anchors" (e.g., wireless access points) 105a-105c and a central localization computation unit 109 to determine their respective location. The anchors may be placed in fixed and known locations. The anchors may transmit and receive signals from nearby agents in an attempt to provide a location for the various agents based on distance (e.g., the distance from the anchor to agent) estimations. The anchors may also be configured to be in communication with the central localization computation unit 109 via connections 107, which may be wireless. In order for an agent to determine its location via a centralized localization method, the various anchors may send information receive from the agents to the central localization computation unit. The central unit 109 may compute the estimated location of each agent in the wireless network. While the centralized localization method may be used to produce reliable location estimations, this method has a drawback of requiring all the computations to be performed in a single location.

Figure 2:
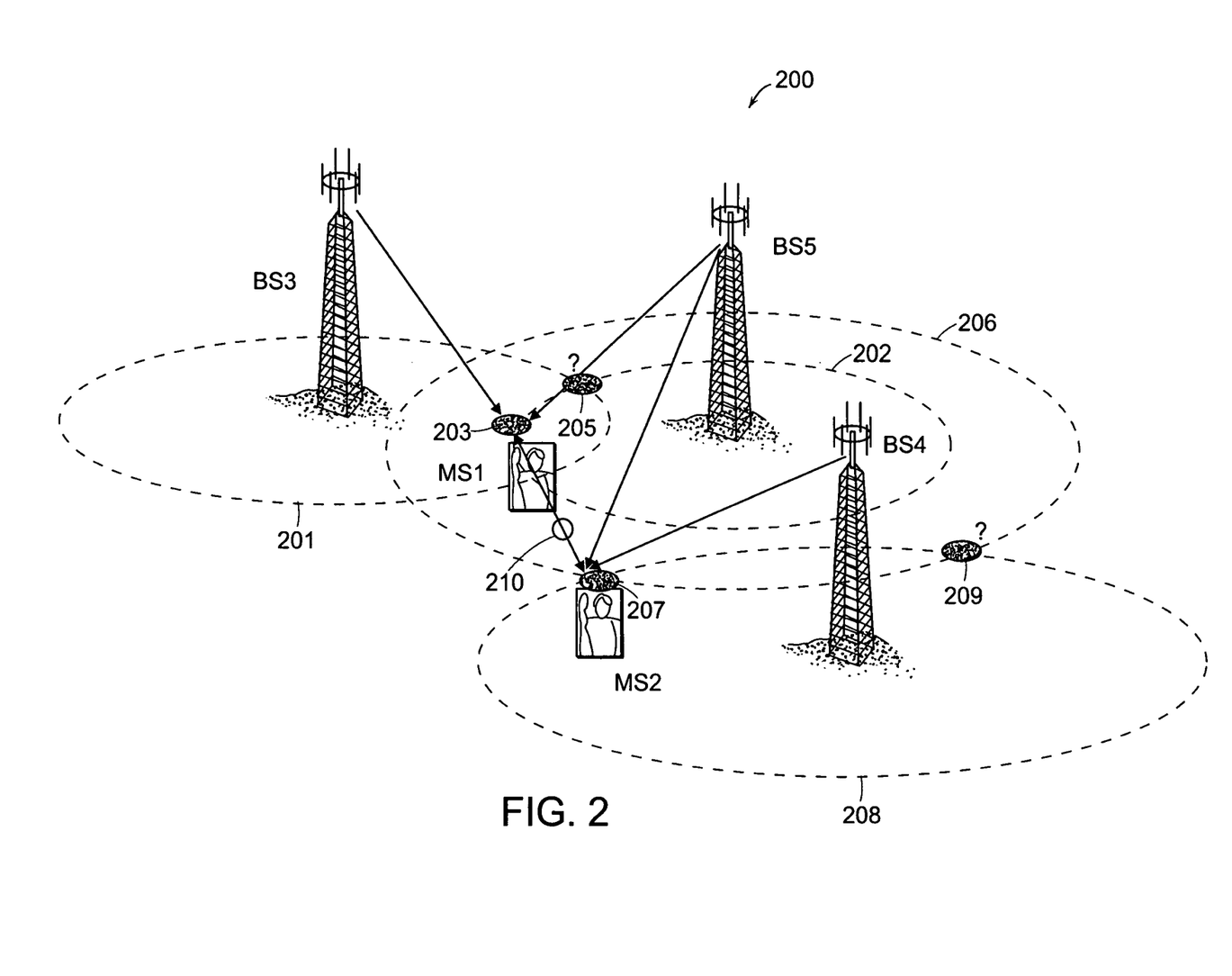

FIG. 2 illustrates an example of a network utilizing a non-cooperative localization method. The network 200 includes three cellular Base Transceiver Stations ("base stations") (BS 3, BS 4, and BS 5), which may serve as anchors. The cellular base stations, or anchors, may each have knowledge of their respective locations. The network may also include a number of mobile stations (MS), such as cellular phones (e.g., MS 1 and MS 2), which may serve as agents. The cellular phones, or agents, may have little or no knowledge of their respective location. Furthermore, the agents may also be mobile throughout the network; therefore, the agents may have a variable location. It should be appreciated that anchors and agents are not limited to base stations and cellular phones, respectively, but may be any form of wireless device, where base stations are included in this definition of wireless device, even though a base station is typically wired to a network. It should also be appreciated that both the anchors and agents may be mobile.

In the non-cooperative method of localization, the agents only communicate with the anchors in determining their location in the network. For example, consider the case where agent MS 1 is located in a position in the network where it is only capable of communicating with anchors BS 3 and BS 5 (i.e., agent MS 1 may not be in range to communicate with anchor BS 4). Therefore, upon communicating with anchor BS 3, agent MS 1 may obtain an information packet (not shown) from the anchor. In the example provided by FIG. 2, the wireless signal corresponding to the information packet may provide a signal metric of an estimate of an attribute of a relative position (ARP) of agent MS 1 to anchor BS 3.

Signal metrics may be based on one or several factors, such as: time of arrival, time difference of arrival, received signal strength, angle of arrival, Doppler shifts, and connectivity. These signal metrics may provide information about a relative position (ARP) between respective transmitters and receivers. For example, to estimate the ARP of distance, the signal metrics time of arrival, time difference of arrival, roundtrip time of flight, received signal strength, and hop-count may be used. To estimate the ARP of angle, the signal metric angle of arrival may be used or information representing antenna steering may be used. To estimate the ARP of connectivity, the signal metric received signal strength (RSS) may be used.

Figure 3A:
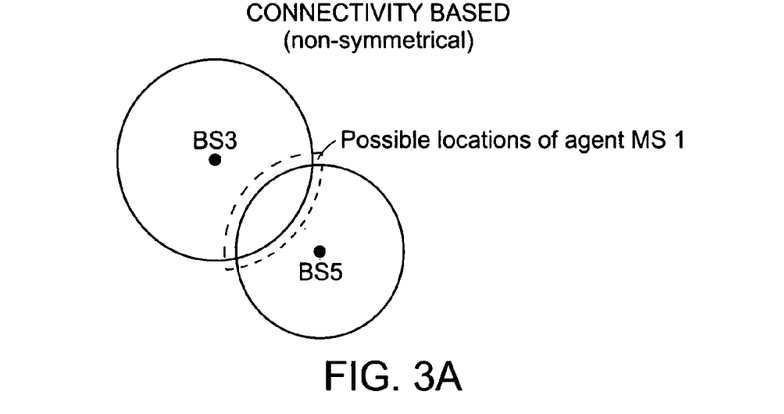
FIGS. 3A-3C are diagrams illustrating examples of attributes of relative positions (ARP) between a wireless device and at least one other wireless device.
Figure 3B:
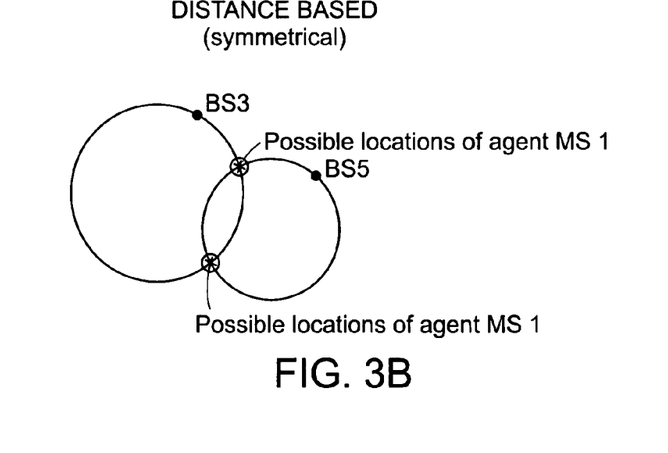
Figure 3C:
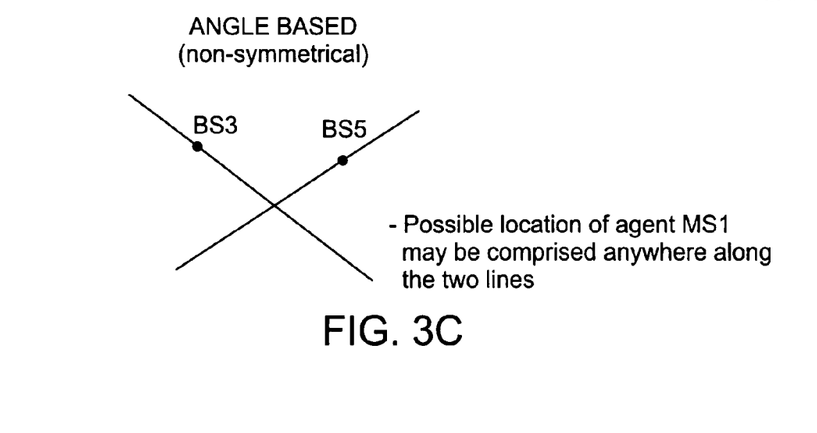

FIGS. 3A-3C provide example forms of the ARP information, which may describe the connectivity (FIG. 3A; constraining the possible locations of the agent MS 1 to be within an area of overlapping discs, each disc having a known radius around anchors BS 3 and BS 5), distance (FIG. 3B; constraining the possible locations of the agent MS 1 to be on a portion of overlapping circumferences of circles, with each circle having a known radius around anchor BS 3 and BS 5, respectively), or the angle (FIG. 3C; constraining the possible locations of the agent MS 1 to be on a set of lines departing from anchor BS 3 or BS 5). Various other ARPs may be obtained based on signal metric data, such as ARPs describing position, pose, velocity, and angular velocity information for a node.

The ARP of distance is symmetrical. For example, the distance from node A to node B is equal to the distance from node B to node A. The ARPs of angle and connectivity may be asymmetrical, since the angle or connectivity from node A to node B may not be equal to the angle or connectivity from node B to node A.

In the example provided by FIG. 2, the signal metric of received signal strength may be used to estimate the symmetrical ARP of distance. Given the ARP estimate, agent MS 1 may determine that it is located at a particular distance, or radius, from the anchor BS 3. The possible locations of the agent MS 1, given the information provided by the anchor BS 3, may be represented by a dotted circle 201.

The agent MS 1 may obtain distance information from the anchor BS 5, resulting in a dotted circle 202 around anchor BS 5, representing all possible locations of MS 1 with respect to the anchor BS 5. Hence, the actual location of the agent MS 1 may be limited to the intersection of the two dotted circles 201 and 202. Therefore, this may result in two possible locations 203 and 205 for the agent MS 1. Since agent MS 1 is not within a communication range of three anchors, MS 1 cannot uniquely determine its own position.

Agent MS 2 may also not be able to uniquely determine its own position since agent MS 2 is only within communication range of anchors BS 4 and BS 5. The possible locations 207 and 209 of agent MS 2 correspond to the intersection of dotted circles 206 and 208.

Another method of determining positions of wireless devices may be by means of cooperative localization. In cooperative localization, agents may communicate both with anchors as well with other agents by exchanging their position estimates. Thus, agents may function as virtual anchors. Agents and anchors may be considered as nodes, where each node may have an ability to communicate with other nodes, regardless of their type. Inter-agent communication removes the need for all agents to be within range of one or more anchors.

However, prior art methods of cooperative localization include a number of drawbacks. Prior art methods of cooperative localization allow only a single location estimate to be sent at a time. Prior art methods of cooperative localization are also limited in that the prior art methods only allow for the use of symmetrical ARPs (e.g., distance based measurements). Furthermore, prior art methods of cooperative localization typically require that all the nodes of the network be heterogeneous, where each node receives and transmits signals resulting in ARPs of a same type. The heterogeneous nodes also require similar hardware and software capabilities to allow the location estimations to be processed in a similar manner.

In an example embodiment of the present invention, cooperative techniques are utilized to obtain possible locations for the agents in the network system by allowing agents and anchors to transmit distributions characterizing the probabilities of possibly multiple locations. In an embodiment of the present invention, signal metrics may be used to obtain ARPs that are symmetrical and asymmetrical. Thus, the cooperative localization method, according to embodiments of the present invention, may employ any ARP known in the art and are not limited solely to the ARP of distance. It should also be appreciated that any signal metric and ARP known in the art may be employed in any example embodiments of the present invention.

In another embodiment of the present invention, the nodes of the system may be heterogeneous, therefore allowing each node to estimate a location by utilizing ARPs that may be non-symmetrical, have unequal values, and be of a different type. The heterogeneous nodes of the network, according to an example embodiment of the present invention, may also include different hardware and software systems from node to node. In another embodiment of the present invention, factor graph theory may be used to develop a fully cooperative localization method to determine an estimated position of all the nodes in the network.

Figure 4:
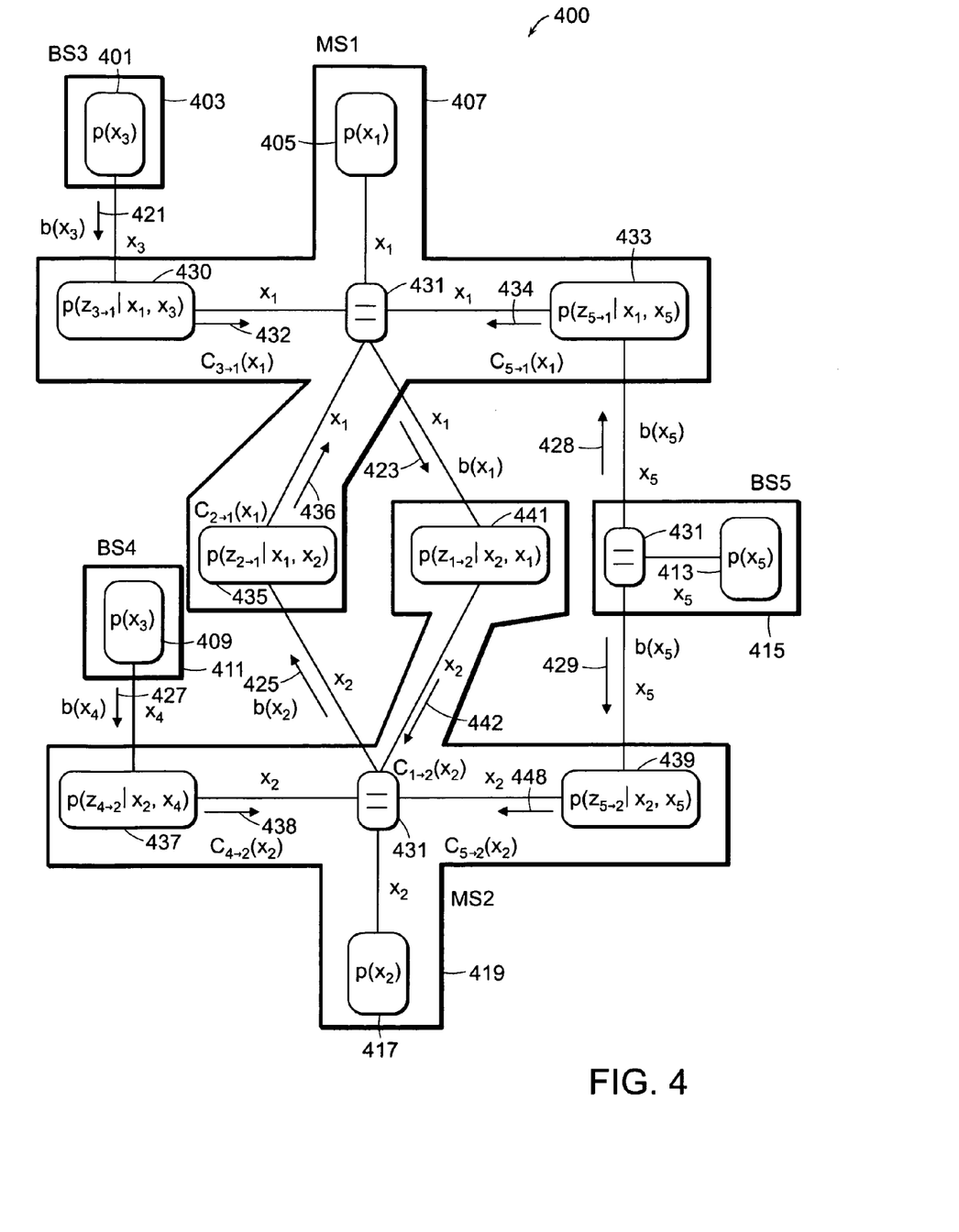
FIG. 4 is a diagram of an example of a factor graph representing the network shown in FIG. 2.
Figure 5:
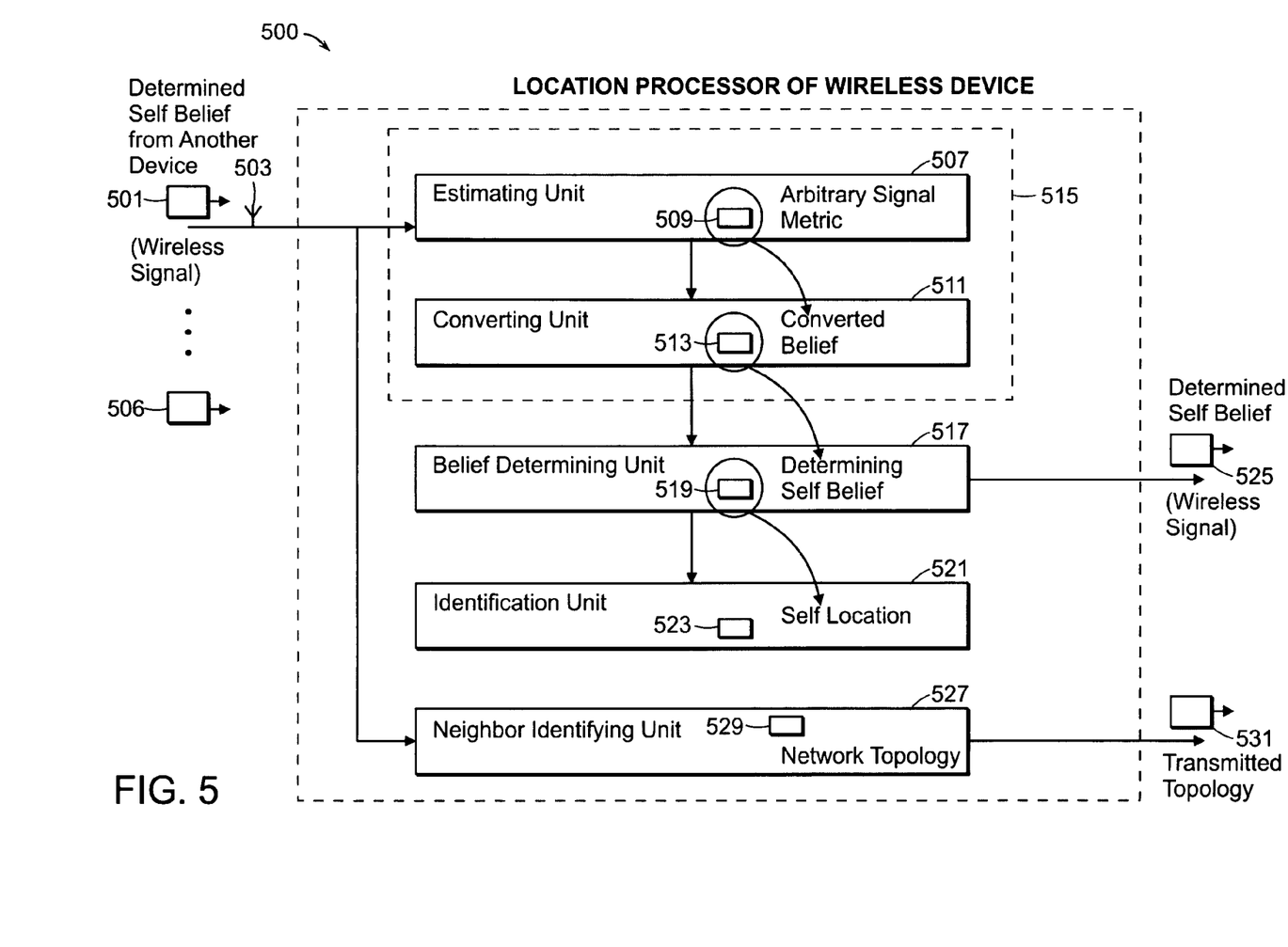
FIG. 5 is a schematic diagram of an example location processor employed in the nodes of FIG. 2.
Figure 6:
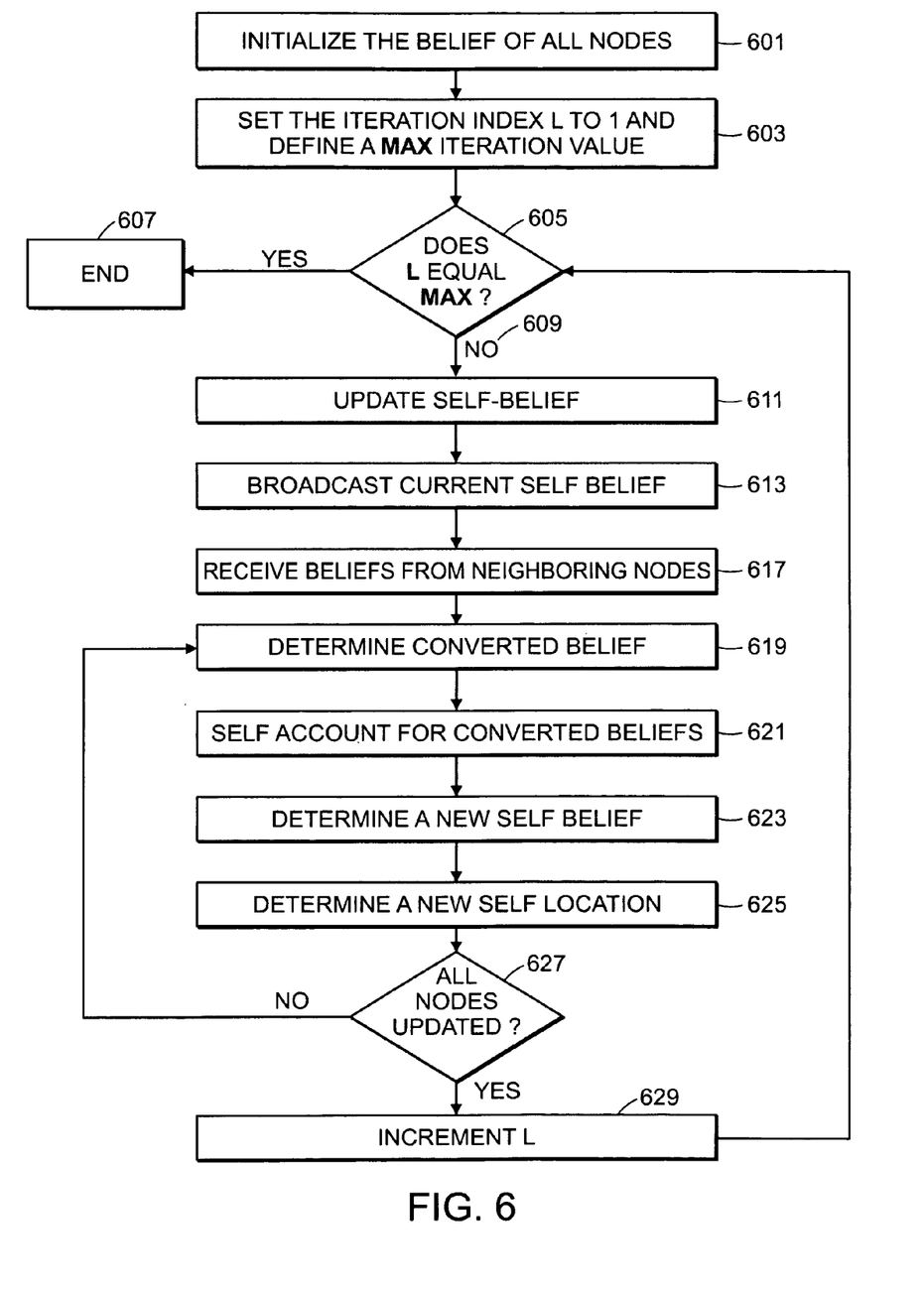
FIG. 6 is a flow diagram depicting example operations of a cooperative localization method according an example embodiment of the present invention.

FIG. 4 is a top view diagram that illustrates a factor graph representation of the network shown in FIG. 2. FIG. 5 represents a schematic of a location processor which may be found in each agent of FIG. 2. FIG. 6 is a flow diagram illustrating possible operations of an example cooperative localization method. FIGS. 4-6 describe a mathematical, hardware, and software approach, respectively, to cooperative localization according to example embodiments of the present invention.

Factor graphs may provide an intuitive way to represent and understand multivariable functions. A factor graph may express a global function as the product of factors, or local functions. By illustrating which factors depend on which variables, a factor graph shows how the variables of the global function are interdependent through shared local functions.

In an example embodiment of the present invention, a factor graph may be obtained from a joint a posteriori probability distribution $p(x_1, \ldots, x_N|Z)$, representing possible positions of all the nodes in the network given the collection of signal metrics Z, with N being equal to the total number of nodes in the network. The joint a posteriori distribution may be expressed as:

$$p(x|z) \propto p(z|x)p(x) = \prod_{i=1}^{N} \prod_{j \in \Gamma_i} p(z_{j \to i} | x_i, x_j) p(x_i)$$

where $z_{j \to i}$ may be a signal metric obtained by node i from a signal transmitted by node j. The function $p(z_{j \to i}|x_i, x_j)$ is the distribution of the signal metric conditioned on the locations of nodes i and j.

Upon obtaining expression for the joint a posteriori probability distribution $p(x_1, \ldots, x_N|Z)$, a sum-product algorithm (SPA), also known as belief propagation, may be used on the created factor graph to determine approximations of marginal a posteriori distributions $p(x_i|Z)$ for all nodes i. These approximations of the marginal a posteriori distribution may be used by every node in the network to estimate its own position $x_i$. These approximations of the marginal a posteriori distributions $p(x_i|Z)$ may also be mapped to the physical network using factor graph theory, which is described in more detail below.

In the example provided by FIG. 4, the five nodes BS 3, BS 5, BS 4, MS 1, and MS 2, of the network of FIG. 2, may be associated with sub-graphs highlighted by boxes 403, 415, 411, 407, and 419, respectively. The possible locations of nodes MS 1, MS 2, BS 3, BS 4, and BS 5 may be represented as edges in the factor graph labeled $x_1$-$x_5$, respectively. The possible locations of the agent nodes MS 1 and MS 2 ($x_1$ and $x_2$, respectively) may be provided by information sent by nearby nodes. The operations of obtaining the possible locations may be represented in the factor graph 400 by vertices, which are described in more detail below.

In an example embodiment of the present invention, the first operation of the cooperative localization method may be to initialize the belief of all the nodes in the network (601). In the initialization, the belief of the anchors and agents may be set equal to their respective marginal a priori distributions $p(x_i)$. The marginal a priori distribution $p(x_i)$ is a function of the variable, $x_i$, for the possible positions of node i. The marginal a priori $p(x_i)$ distribution may reflect the knowledge node i may have before the start of the localization process. The marginal a priori distribution for each node in the network BS 3, BS 5, BS 4, MS 1, and MS 2 are labeled as vertices 401, 413, 409, 405, and 417, respectively.

Since the anchors BS 3, BS 5, and BS 4 have knowledge of their respective locations, the anchors may initialize their beliefs to an a priori distribution in the form of a Dirac delta distribution. A Dirac delta distribution is a function defining a non-zero probability for only one position, which is the known location for the respective anchor. It should be appreciated that there may be anchors in the network who may not have full knowledge of their location at all times; therefore, the a priori distribution of an anchor with partial knowledge of its location may be in the form of a distribution including an arbitrary shape.

The agents MS 1 and MS 2 may initialize their beliefs to an a priori distribution in the form of a uniform distribution. The uniform distribution may have an equal probability value for all possible locations of the respective agent, since the agent may not initially have knowledge of its self location. The agents may also have partial knowledge of their location, thereby causing the a priori distribution to have an arbitrary shape. The agents may also have full knowledge of their location, which results in an a priori distribution defined by a Dirac delta distribution.

It should be appreciated that the agents and anchors may have any of the above mentioned distributions as well as any other distributions known in the art. It should also be appreciated that agents and anchors need not all have the same distributions as there may be some agents and anchors who have more knowledge of their respective locations in comparison to other agents and anchors.

In one embodiment, upon initializing the beliefs of all the nodes in the network, an iteration value may be set or determined (603). The iteration value may define the number of times the cooperative localization method may be executed by each node in the network. The maximum iteration value 'max' may be set dynamically to the run-time of the network. Thus, the network may be configured to track constantly and localize the various devices associated with the network. It should be appreciated that not all nodes may take part in every iteration.

Once an iteration has been defined, the system may continually or continuously monitor a current value of the iteration 'L' to determine if the maximum iteration value 'max' has been reached (605). If it is determined that the maximum iteration value 'max' has been reached, the localization system may be directed to come to an end (607). Otherwise, the nodes in the network, or node system, may proceed with an iteration of the cooperative localization (609). First, the system may be configured to update the self-beliefs of all the nodes in the network (611). The self-belief updating may be based on the mobility of the nodes, and may rely on any technique known in the art, such as an inertial measurement unit or gyroscope. Both the agents and the anchors may have the ability to be mobile. It should be appreciated that, in at least one embodiment, not all nodes in the network are updated; therefore, only a subset of the nodes are updated at a time in such an embodiment. Thus, the marginal a priori distributions $p(x_i)$ of each node BS 3, BS 5, BS 4, MS 1, and MS 2, labeled as vertices 401, 413, 409, 405, and 417, respectively, may be updated, accordingly.

Furthermore, during this time, new nodes may be detected as entering the network or current nodes may be detected as departing the network, thus changing the configuration of the factor graph (e.g., new sub-graphs corresponding to nodes entering the network may be added to the factor graph, or sub-graphs of nodes departing the network may be removed). Thus, the topology of the factor graph may change as the topology of the network changes throughout the lifetime of the cooperative localization process.

Next, all the nodes in the network may broadcast their current self-belief (613). This broadcasting may be achieved with the use of an SPA. The SPA may be applied as message passing on the factor graph to obtain approximations of the marginal a posteriori distributions $p(x_i|Z)$ for each node in the network. The marginal a posteriori distribution $p(x_i|Z)$ may be approximated by the self-belief $b(x_i)$.

For example, in the factor graph shown in FIG. 4, the anchor BS 3 may transmit its self-belief, $b(x_3)$ 421, to agent MS 1, since agent MS 1 is in communication range of anchor BS 3. Similarly, agent MS 1 may act as a virtual anchor and transmit its self-belief, $b(x_1)$ 423, to agent MS 2, since agent MS 1 is within communication range of agent MS 2. Likewise, agent MS 2 may also act as a virtual anchor and transmit its self-belief, $b(x_2)$ 425, to agent MS 1. The anchor BS 4 is in communication range of agent MS 2 and may therefore transmit its self-belief, $b(x_4)$ 427, to agent MS 2. The anchor BS 5 is in communication range to both agent MS 1 and agent MS 2, and may therefore transmit its self-belief, $b(x_5)$ 428 and 429, to agent MS 1 and agent MS 2, respectively.

In the sub-graph 415 associated with anchor BS 5, an equality vertex 431 may be used when sending self-beliefs to multiple nodes. Similarly, the sub-graphs 407 and 419 of agents MS 1 and MS 2, respectively, also include equality vertices 431 since the agents are in communication with multiple nodes.

It should be appreciated that a node may send and receive multiple message packets during the broadcast period. For example, if node A estimates the signal metric of round-trip time, node A may send a packet to node B, and node B may send a packet back to node A.

Upon the self-belief broadcast of each node in the network, each node may individually employ a location processor 500 to compute a new self-belief based on the broadcasted beliefs. First, a node may receive the broadcasted beliefs 501 from other nodes in the network via an antenna 503 (617). Each node may receive any number of broadcasted beliefs 505 from any number of nodes within the communication range of the node receiving the beliefs.

After receiving the beliefs from nearby nodes, a node may begin the process of producing a converted belief (619). In the process of producing a converted belief, the location processor of a node may provide an estimation unit 507 configured to receive the transmitted belief 501 in order to estimate an arbitrary signal metric of the node in relation to at least one other node in the network. An arbitrary signal metric is a signal metric that may be of any type or value (e.g., the type of signal metric that may be used is not limited to symmetrical or homogenous signal metric). The estimated arbitrary signal metric 509 may be a function of the received belief signal from the at least one node.

It should be appreciated if an arbitrary signal metric has been estimated from the same transmitting node from a prior iteration, or before the start of the localization process, a new arbitrary signal may or may not be estimated. It should also be appreciated that the nodes in the network may be heterogeneous such that the ARP estimates obtained from the estimated signal metrics may use different types and/or values from node to node.

Furthermore, the nodes in the network may also be heterogeneous such that each node may use a different technique or process of estimating the signal metric. It should also be appreciated that the signal metrics and ARPs may be estimated through any combination of analytical, numerical, or statistical methods. It should also be appreciated that each node may estimate signal metrics independently of the other nodes in the network. For example, node A may estimate signal metrics from received messages without the knowledge of the estimated signal metrics of other nodes in the network.

Once an arbitrary signal metric 509 has been provided, this signal metric may be sent to a converting unit 511 in order to provide a converted belief 513 based on the estimated arbitrary signal metric 509. Each node in the network may have multiple estimating and converting units, or a calculating unit 515, that may be configured to determine converted beliefs 513 for each of the received incoming beliefs 501 simultaneously. Alternatively, the estimating and converting units, or calculating unit 515, may be configured to determine converted beliefs 513 for each of the received incoming beliefs

501 sequentially. It should be appreciated that a belief transmitted from another node may be used by a current node to estimate any number of signal metrics, which may, in turn, be used to describe any number of APRs.

The generation of the converted beliefs may be explained mathematically with the use of FIG. 4. For example, in the agent MS 1 the generation of the converted belief, resulting from a self-belief 421 from anchor BS 3 being transmitted to agent MS 1, may be represented by the vertex 430. The SPA may be configured to send the generated converted belief, $c_{3\rightarrow1}(x)$ 432, to the equality vertex 431. Similarly, the transmitted self-belief 428 from the anchor BS 5 may be used to obtain estimated arbitrary signal metrics to generate a converted belief, which is illustrated by the vertex 433. The converted belief, $c_{5\rightarrow1}(x_1)$ 434, may then also be sent to the equality vertex 431. Finally, the generation of a third converted belief, based on the transmitted self-belief 425, may be illustrated via the vertex 435. The generated converted belief, $c_{2\rightarrow1}(x_1)$ 436, may also be sent to the equality vertex 431 via the SPA.

Likewise for the agent MS 2, converted belief generation may be represented by vertices 441, 437, and 439, resulting in converted beliefs $c_{1\text{-}2}(x_2)$ 442, $c_{4\rightarrow2}(x_2)$ 438, and $c_{5\rightarrow2}(x_2)$ 448, respectively. The converted beliefs $c_{1\text{-}2}(x_2)$ 442, $c_{4\rightarrow2}(x_2)$ 438, and $c_{5\rightarrow2}(x_2)$ 448 may be sent to the equality vertex 431 of sub-graph MS 2 via the SPA.

The generation of the converted beliefs may be represented by the following equation:

$$c_{j\rightarrow i}(x_i) \propto \int p(z_{j\rightarrow i}|x_i,x_j)b^{(L-1)}(x_j)dx_j$$

where $c_{j\rightarrow i}(x_i)$ is the converted belief generated in the current node i, $p(z_{j\rightarrow i}|x_i,x_j)$ is the distribution of signal metric $z_{j\rightarrow i}$ extracted from the signal transmitted from node j to the current node i, and $b^{(L-1)}(x_j)$ is the self-belief broadcasted by node j to the current node i. The integration described above may be a multi-dimensional integration performed over for all possible $x_j$. It should be appreciated that the generation of converted beliefs may be performed through any combination of analytical, numerical, or statistical integration methods. It should also be appreciated that the converted belief may take into account any uncertainties associated with the estimated signal metric $z_{j\rightarrow i}$ as a function of the locations $x_i$ and $x_j$, as well as any knowledge regarding the environment (e.g., the presence of obstacles, low signal-to-noise ratio, weak signal strength, inherent uncertainty in the estimation process, etc.). It should be appreciated that the generation of the converted beliefs may be performed through any combination of analytical, numerical, or statistical methods.

Once all of the converted beliefs have been sent to the equality vertices 431 of the sub-graphs of their respective nodes, the equality vertex 431 may evaluate each converted belief. The equality vertex 431 may self account for inconsistencies, such as if the value of one generated converted belief is significantly different from the other generated converted beliefs (621). For example, if a converted belief is the result of a transmitted self-belief sent from a malfunctioning node, this self-belief may offset subsequent localization calculations. The malfunctioning node may be a node transmitting signals with a low signal-to-noise ratio, a node transmitting false information, or a node transmitting information leading to a location estimation which varies greatly from location estimations obtained by information transmitted from other nodes.

Once the converted beliefs have been evaluated for inconsistencies, a new self-belief for each node may be determined (623). The location processor 500 of each node may forward all the generated converted beliefs 513 to a belief determining unit 517. The belief determining unit 517 may generate a new determined self-belief 519 by taking into account the marginal a priori distribution $p(x_i)$ of the current node as well as the generated converted beliefs, which are a function of the transmitted self-beliefs from the nodes in the network within communication range.

The generation of the new determined self-belief 519 may be performed with taking a prior determined self-belief into account. In other words, the belief determining unit 517 may determine the new self-belief 519 with memory, or knowledge, of a self-belief determined from a prior iteration. The determination of the new self-belief 519 with memory may be represented as follows:

$$b^{(L)}(x_i) \propto b^{(L-1)}(x_i) \prod_{j\in\Gamma_i} c_{j\rightarrow i}(x_i)$$

where $b^{(L)}(x_i)$ is the self-belief of node j being determined during the current iteration L, $b^{(L-1)}(x_i)$ is the self-belief of node j determined in a prior iteration L−1, $\Gamma_i$ is the set of the neighboring nodes of node i, from which node i has selected a consistent converted belief, and $c_{j\rightarrow i}(x_i)$ is the converted belief generated by signal metrics sent to node j from node i. It should be appreciated that the generation of the new determined self-belief 519 may also be performed without memory or knowledge of a self-belief determined from a prior iteration. The new self-belief 519 generated without memory may be represented as follows:

$$b^{(L)}(x_i) \propto \prod_{j\in\Gamma_i} c_{j\rightarrow i}(x_i)p(x_i)$$

where $p(x_i)$ is the marginal a priori distribution of the current node i. Therefore, the marginal a priori distribution may be utilized in systems which do not take into account prior generated self-beliefs. It should be appreciated that the belief determining unit 517 may utilize both the marginal a priori distribution and the prior generated self-belief of the current node i. It should also be appreciated that the nodes in the network may be heterogeneous in that some nodes may generate the new self-belief with memory, while other nodes in the network may not use memory to generate the new self-belief. It should also be appreciated that the generation of the new determined self-beliefs 519, with or without memory, may be performed through any combination of analytical, numerical, or statistical methods. It should be appreciated that not every node in the network may need to generate a self-belief. For example, if it has been determined that a node has a defined location and has not moved since the prior iteration, that node need not be update its self-belief.

Upon determining a new self-belief, an identifying unit 521 may be used to estimate a self-location 523 (625). The estimated self-location 523 may be determined by taking the mean, median, or mode, of the determined self-belief, which may be in the form of a probability distribution. The nodes in the network may utilize different methods of estimating the self-location 523.

The location processor 500 of the nodes in the network may also include a neighbor identifying unit 527. The neighbor identifying unit 527 may be used to estimate a location of the nodes within communication range by taking the mean, median, or mode, of the beliefs transmitted by the neighboring nodes. Thus, a topological map 529 of the nodes in the network may be created, giving each node knowledge of this topology. This may give every node in the network access to the complete network topology. The topological map may be broadcast 531 by every node in a separate data packet. It should be appreciated that the transmitted topology 531 may also be comprised as part of the data packet comprising the transmitted determined self-belief 525. It should also be appreciated that the nodes in the network may employ different methods of creating the topological map 529.

It should also be appreciated that the estimated signal metrics generated by each node may provide an ARP that may include information on obstacles. Obstacles may exist between or around the nodes in the network. Examples of obstacles may include, but are not limited to, walls or buildings. This information may also be used in generating a topology of the network and in generating self-beliefs.

The above mentioned operations 615-625 may be performed for all of the nodes in the network during the present iteration (627). Once the operations 615-625 have been performed on all the nodes in the network, a new iteration may be performed (629). During the new iteration, the determined self-beliefs 517 may be updated to account for mobility (611) as previously described. Once updated, the updated determined self-belief may then be broadcast 525, and the operations 615-625 described above may then be performed using the updated determined self-beliefs. It should be appreciated that not every node in the network need be involved in all iterations. Furthermore, nodes may not participate in every computational operation involved in the iteration.

It should be understood that certain processes, such as the cooperative localization process, disclosed herein, may be implemented in hardware, firmware, or software. If implemented in software, the software may be stored on any form of computer readable medium, such as random access memory (RAM), read only memory (ROM), compact disk read only memory (CD-ROM), and so forth. In operation, a general purpose or application specific processor loads and executes the software in a manner well understood in the art.

While this invention has been particularly shown and described with references to example embodiments thereof, it will be understood by those skilled in the art that various changes in form and details may be made therein without departing from the scope of the invention encompassed by the appended claims.

What is claimed is:

1. A method for a wireless device to identify a self location in a wireless network comprising:
   by a processor of the wireless device, converting at least one belief to a converted belief, the at least one belief representing a first distribution of at least one possible location of the wireless device within the wireless network, the at least one converted belief being a function of an arbitrary signal metric associated with a wireless signal received by the wireless device from at least one other wireless device and at least one received self-belief from the at least one other wireless device to the wireless device, the at least one received self-belief representing a second distribution of at least one possible location of the at least one other wireless device within the wireless network;
   by the processor of the wireless device, determining a self-belief as a function of the at least one converted belief, the at least one converted belief representing a third distribution of the at least one possible location of the wireless device generated by considering all possible positions of the at least one other wireless device represented in the second distribution; and
   by the processor of the wireless device, identifying a self location, as a function of the self-belief, within the wireless network.

2. The method of claim 1 wherein a physical configuration of the wireless network is time varying.

3. The method of claim 1 wherein at least a subset of multiple other wireless devices is mobile relative to at least one other subset of multiple other wireless devices.

4. The method of claim 1 wherein at least a subset of multiple other wireless devices estimates the arbitrary signal metric of a first type, and at least one other subset of multiple other wireless devices estimates the arbitrary signal metric of a second type.

5. The method of claim 4 wherein the arbitrary signal metric is used to calculate a characteristic of the wireless device with respect to the at least one other wireless device, the characteristic selected from the group consisting of: angle, distance, connectivity, position, pose, velocity, and angular velocity information.

6. The method of claim 4 wherein the arbitrary signal of the first type is asymmetrical with respect to the arbitrary signal of the second type.

7. The method of claim 1 wherein converting the at least one belief and determining the self-belief are based on factor graph principles.

8. The method of claim 1 wherein converting the at least one belief further comprises self accounting for a capability related to estimating the arbitrary signal metric.

9. The method of claim 1 wherein determining the self-belief further comprises updating a previously determined self-belief or determining a new self-belief.

10. The method of claim 1 further comprising identifying a location of the at least one other wireless device in the wireless network.

11. The method of claim 1 wherein the distribution is a probability density or a mass function.

12. A location indicator apparatus for identifying a self location of a wireless device in a wireless network, the apparatus comprising:
    a converting unit configured to convert at least one belief into a converted belief, the at least one belief representing a first distribution of at least one possible location of the wireless device within the wireless network, the at least one converted belief being a function of an arbitrary signal metric associated with a wireless signal received by the wireless device from at least one other wireless device and at least one received self-belief from the at least one other wireless device to the wireless device, the at least one received self-belief representing a second distribution of at least one possible location of the at least one other wireless device within the wireless network;
    a self-belief determining unit configured to determine a self-belief as a function of the at least one converted belief, the at least one converted belief representing a third distribution of the at least one possible location of the wireless device generated by considering all possible positions of the at least one other wireless device represented in the second distribution; and
    an identifying unit configured to identify a self location, as a function of the self-belief, within the wireless network.

13. The apparatus of claim 12 wherein a physical configuration of the wireless network is time varying.

14. The apparatus of claim 12 wherein at least a subset of multiple other wireless devices is mobile relative to at least one other subset of multiple other wireless devices, wherein the respective calculating, self-belief determining, and identifying units are further configured to account for mobility.

15. The apparatus of claim 12 wherein respective calculating units of at least a subset of multiple other wireless devices is configured to estimate the arbitrary signal metric of a first type, and respective calculating units of at least one other subset of the at least one other wireless device is configured to estimate the arbitrary signal metric of a second type.

16. The apparatus of claim 15 wherein the arbitrary signal metric measures a characteristic of the wireless device with respect to the at least one other wireless device, the characteristic selected from the group consisting of: angle, distance, connectivity, position, pose, velocity, and angular velocity information.

17. The apparatus of claim 15 wherein the arbitrary signal of the first type is asymmetrical with respect to the arbitrary signal of the second type.

18. The apparatus of claim 12 wherein the converting unit is further configured to convert the at least one belief, and the determining unit is configured to determine the self-belief, based on factor graph principles.

19. The apparatus of claim 12 wherein the calculating unit is further configured to self account for a capability related to estimating the arbitrary signal metric.

20. The apparatus of claim 12 wherein the determining unit is further configured to update a previously determined self-belief or determine a new self-belief.

21. The apparatus of claim 12 the identifying unit is further configured to identify a location of at least one other wireless device in the wireless network.

22. The apparatus of claim 12 wherein the distribution is a probability density or a mass function.

23. A non-transitory computer program product having a computer program stored thereon, the computer program defined by instructions which, when executed by a processor in a wireless device in a wireless network, cause the processor to:
  convert at least one belief to a converted belief, the at least one belief representing a first distribution of at least one possible location of the wireless device within the wireless network, the at least one converted belief being a function of an arbitrary signal metric associated with a wireless signal received by the wireless device from at least one other wireless device and at least one received self-belief from the at least one other wireless device to the wireless device, the at least one received self-belief representing a second distribution of at least one possible location of the at least one other wireless device within the wireless network;
  determine a self-belief as a function of the at least one converted belief, the at least one converted belief representing a third distribution of the at least one possible location of the wireless device generated by considering all possible positions of the at least one other wireless device represented in the second distribution; and
  identify a self location, as a function of the self-belief, within the wireless network.

24. The method of claim 1 wherein considering all possible positions of the at least one other wireless device represented in the second distribution includes performing a multi-dimensional integration performed over all of the possible positions.

* * * * *